United States Patent [19]

Erickson

[11] Patent Number: 5,247,014
[45] Date of Patent: Sep. 21, 1993

[54] METHOD OF CHEMICALLY CROSSLINKING UNSATURATED POLYMERS

[75] Inventor: James R. Erickson, Katy, Tex.

[73] Assignee: Shell Oil Company, Houston, Tex.

[21] Appl. No.: 856,317

[22] Filed: Mar. 23, 1992

Related U.S. Application Data

[62] Division of Ser. No. 558,370, Jul. 27, 1990, Pat. No. 5,124,405.

[51] Int. Cl.$^5$ .................... C08L 53/00; C08L 9/00; C08L 61/00
[52] U.S. Cl. .................... 525/92; 525/164; 525/518
[58] Field of Search ............ 525/92, 164, 518

[56] References Cited

U.S. PATENT DOCUMENTS 2,522,349  9/1950  D'Ianni ........................... 525/164

OTHER PUBLICATIONS

"Melamine/Formaldehyde Crosslinkers: Characterization, Network Formation . . . ", D. Bauer, Prog. In Organic Coatings, 14, 1986, pp. 193–218.
The Chemistry of Organic Film Formers, D. H. Solomon, publ. by J. Wiley & Sons, pp. 222–250.
Fifty Years of Amino Coating Resins, A. J. Kirsch, publ. by American Cyanamid, 1986.
Journal of Coatings Tech., vol. 51, No. 656, pp. 61–70, Sep. 1979, "Reaction Mechanism of Melamine Resins".
Journal of Coatings Tech., vol. 51, No. 658, pp. 101–110, Nov. 1979, "Chemistry of Glycoluril-Formaldehyde Resins and Their . . . ".
Journal of Coatings Tech., vol. 52, No. 660, pp. 75–83, Jan. 1980, "Effect of Catalyst Structure on the Properties . . . ".
Advanced Organic Chemistry, J. March, publ. by J. Wiley & Sons, 3rd ed., 1985, pp. 856–858.
Rubber Chem. and Tech., vol. 61, No. 3, pp. 422–447, "Sulphur-Free Vulcanization Systems for Diene Rubber".

Primary Examiner—James J. Seidleck
Assistant Examiner—M. L. Warzel
Attorney, Agent, or Firm—Donald F. Haas

[57] ABSTRACT

This invention is a method of curing unsaturated polymers which do not have a significant amount of functional groups which undergo a crosslinking reaction with amino resins and which preferably comprise at least one conjugated diolefin monomer, said method comprising mixing said polymer with an amino resin in the presence of a proton-donating acid catalyst.

20 Claims, No Drawings

METHOD OF CHEMICALLY CROSSLINKING UNSATURATED POLYMERS

This is a division of application Ser. No. 558,370, filed Jul. 27, 1990 now U.S. Pat. No. 5,124,405.

BACKGROUND OF THE INVENTION

This invention relates to a novel method of crosslinking unsaturated block polymers. These polymers contain a tertiary carbon atom and may especially be polymers of conjugated diene monomers. Additionally, it relates to novel polymers made by the claimed method and adhesives and sealants made with the polymers.

It is known that a polymer can be obtained by an anionic polymerization of a conjugated diene compound or copolymerization with another diene or an alkenyl arene compound by using an organic alkali metal initiator. Thus, homopolymers and random and block copolymers can be made. Block copolymers have been produced which comprise primarily those having a general structure A—B and A—B—A wherein the polymer blocks A comprise thermoplastic polymer blocks of alkenyl arenes such as polystyrene, while block B is a polymer block of a conjugated diene. The proportion of the thermoplastic blocks to the elastomeric polymer block and the relative molecular weights of each of these blocks is balanced to obtain a rubber having unique performance characteristics. When the content of the alkenyl arene is small, the produced block copolymer is a so-called thermoplastic rubber. In such a rubber, the blocks A are thermodynamically incompatible with the blocks B resulting in a rubber consisting of two phases; a continuous elastomeric phase (blocks B) and a basically discontinuous hard, glass-like plastic phase (blocks A) called domains. Since the A-B-A block copolymers have two A blocks separated by a B block, domain formation results in effectively locking the B blocks and their inherent entanglements in place by the A blocks and forming a network structure.

These domains act as physical crosslinks anchoring the ends of many block copolymer chains. Such a phenomena allows the A-B-A rubber to behave like a conventionally vulcanized rubber in the unvulcanized state and is applicable for various uses. For example, these network forming polymers are applicable for uses such as moldings of shoe soles, impact modifiers for polystyrene resins and engineering thermoplastics, in adhesive and binder formulations and in the modification of asphalt.

Conversely, as the A-B block copolymers have only one A block, domain formation of the A blocks does not lock in the B blocks and their inherent entanglements. Moreover, when the alkenyl arene content is small resulting in a continuous elastomeric B phase, the strength of such polymers is derived primarily from the inherent entanglements of the various B blocks therein and to a lesser extent the inherent entanglements of the A blocks therein. Other non-network-forming polymers include homopolymers of conjugated dienes and copolymers of at least two conjugated dienes.

Both the network forming and non-network forming polymers are physically crosslinked. Light covalent crosslinking can be used to reinforce the physical crosslinking already present in such polymers and makes these polymers less susceptible to property losses at high temperature or in the presence of solvents and plasticizers. This allows them to be used in a broader array of applications such as high temperature masking tapes, permanent automotive tapes and sealants and permanent laminating adhesives.

Such reinforcing crosslinking can be achieved by radiation curing. However, radiation curing has certain disadvantages including the necessity for additional expensive equipment when EB processing or photoinitiation and acrylic monomers when using UV. If chemical crosslinking could be utilized, certain of these disadvantages could be eliminated. Amino resins have been widely used to crosslink various polymers and resins. However, up to the present time it has been thought that chemical crosslinking could only be achieved in polymers and resins which contained carboxyl groups or other functional groups. For instance, see 50 *Years of Amino Coating Resins*, edited and written by Albert J. Kirsch, published in 1986 by American Cyanamid Company, which describes in detail a whole series of amino resins which are useful in the present invention. It is stated therein on page 20 that the backbone polymers, i.e., the polymers which are to be crosslinked, "must contain one or more of the functional groups—hydroxy, carboxy, amide—listed above to be useful with amino resins". The foregoing publication is herein incorporated by reference. I have unexpectedly found that I can carry out crosslinking of the unfunctionalized unsaturated polymers described below using such chemical agents.

SUMMARY OF THE INVENTION

The present invention is a method of curing unsaturated polymers which do not have a significant amount of functional groups which undergo a crosslinking reaction with amino resins and which have a double bond between a tertiary carbon atom and another carbon and especially polymers which comprise at least one conjugated diolefin monomer. The polymer is mixed with the amino resin in the presence of a proton-donating acid catalyst. The preferred polymers comprise at least one block A which comprises predominantly monoalkenyl aromatic hydrocarbon monomer units and at least one block B which comprises predominantly conjugated diolefin monomer units.

The amount of amino resin used generally ranges from about 0.5 to 40% of the weight of the polymer and the preferred amino resins for use in the present invention are glycoluril-formaldehyde resin and urea-formaldehyde resin. The amount of acid catalyst used generally ranges from about 0.1 to about 4% of the weight of the polymer. The present invention also relates to a cured polymer made according to the method described above. Finally, the invention relates to an adhesive or sealant made with such a cured polymer.

DETAILED DESCRIPTION OF THE INVENTION

Any polymer containing a double bond between a tertiary carbon atom and another carbon may be crosslinked according to the present invention. Such polymers do not include those which contain significant amounts of functional groups that are normally considered necessary for amino resin crosslinking—i.e. hydroxy, carboxy, mercaptan, amide. Polymers having the following structural features may especially be used:

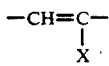 (1)

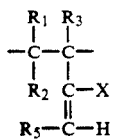 (2)

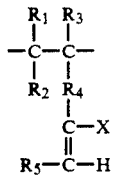 (3)

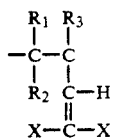 (4)

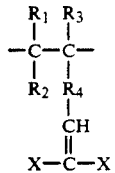 (5)

where X is connected to a doubly bound carbon atom and is selected from the group consisting of R, OR, SR, NR, OSiR or $SiZ_3$, and R is either alkyl, alkenyl, or aryl and Z is alkyl or alkoxy. $R_1$, $R_2$, $R_3$, and $R_5$, are selected from the group consisting of hydrogen, alkyl, alkenyl or aryl, and $R_4$ is either alkyl, alkenyl or aryl.

A specific example is a polymer made from 1,3-isoprene monomer such that 1,4-isoprene units are produced. A 1,4-isoprene unit contains structural feature 1 where the X is $CH_3$.

$$-CH_2-CH=C-CH_2- \atop | \atop CH_3 \qquad (1)$$

Another example is an isoprene based polymer where 3,4-isoprene monomer units result. This is an example of structure 2 where X is $CH_3$ and $R_1=R_2=R_3=R_5=$ hydrogen.

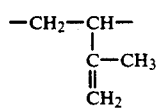 (2)

Polymers made from myrcene can exhibit several of the structures. Myrcene (2-methyl-6-methylene-2,7-octadiene)monomer.

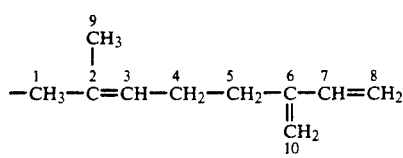

7,8-myrcene mer is an example of both structure 2 and structure 5.

$$-CH_2-CH- \atop | \atop C-CH_2-CH_2-CH=C \atop \| \qquad \qquad | \atop CH_2 \qquad \qquad CH_3 \qquad CH_3 \qquad (2)$$

where X is the alkenyl group $$CH_2-CH_2-CH=C(CH_3)_2$$

and $R_1$, $R_2$, $R_3$ and $R_5$ are hydrogen.

$$-CH_2-CH- \atop | \atop C=CH_2 \atop | \atop CH_2 \atop | \atop CH_2 \atop | \atop CH \atop \| \atop CH_3-C-CH_3 \qquad (5)$$

where the 'X's are methyl groups and $R_4$ is the alkenyl group $$CH_2-CH_2-C \atop \| \atop CH_2$$

and $R_1$, $R_2$, $R_3$ are hydrogen.
8,10-myrcene is an example of structure 1.

$$-CH_2-CH=C-CH_2- \atop | \atop CH_2 \atop | \atop CH_2 \atop | \atop CH \atop \| \atop CH_3-C-CH_3 \qquad (1)$$

where X is the alkenyl group $$CH_2-CH_2-CH=C(CH_3)_2$$

The above polymers have not been considered crosslinkable with amino resins. Surprisingly, however, I have found that specific unfunctionalized polymers are crosslinkable with amino resins. These polymers may be crosslinked with themselves or with other polymers of the type described herein. They may also be crosslinked with polymers that are normally crosslinkable with amino resins such as polyesters, epoxys, acrylics, alkyds, polyurethanes, etc.—a heretofore unheard of possibility.

A polymer is unfunctionalized if it does not contain a significant amount of functional groups. Quantitizing what constitutes a significant amount of functional groups is difficult at best because of differences between various amino resins, acids, polymers, the level of these in a given formulation, the type of functional group, the conditions of cure, etc. Also complicating the matter is the degree of cure required by the enduse application. Only a high polymer gel content may be needed to impart a needed property, or both high gel content and a significant crosslink density, enough to prevent appreciable swelling by a good solvent, may be needed.

Brushing aside the above difficulties, two "rules of thumb" are offered. First, if only high polymer gel content (greater than about 60-70%) is needed, significant functionality is present when the number of milliequivalents of functionality per 100 grams of the polymer equals or exceeds the value F, where F is given by the following relationship.

$$F = k \cdot \frac{10 \text{ Meq}/100 \text{ gram}}{M_w \cdot 10^{-5}}$$

and k is somewhere between about 1 and 3. may vary over wider limits for very high or very low molecular weight polymers. Second, if both high gel content and significant crosslink density are required, significant functionality is present when the number of milliequivalents of functionality per gram of polymer equals or exceeds the larger of either the F value or about 10 Meq/100 g. For example, if the weight average molecular weight, $M_w$, of the polymer is 100,000 daltons the value of F is about 10 to about 30 Meq/100 g. If the $M_w$ is one million daltons, the value of F is about 1 to about 3 Meq/100 g and a high gel content will be obtained at or above this level. The polymer will swell appreciably when exposed to a good solvent unless the level of functionality equals or exceeds about 10 Meq/100 g of polymer.

Polymers containing ethylenic unsaturation can be prepared by polymerizing one or more polyolefins, particularly diolefins, by themselves or with one or more alkenyl aromatic hydrocarbon monomers. The polymers may be random, tapered, block or a combination of these. When the double bonds in the polyolefin are separated by three or more carbon atoms, the ethylenic unsaturation incorporated into the polymer will be contained in a branch extending outwardly from the main polymer chain but when the polyolefin is conjugated at least a portion of the ethylenic unsaturation incorporated into the polymer may be contained in the polymer backbone.

As is well known, polymers containing ethylenic unsaturation or both aromatic and ethylenic unsaturation may be prepared using free-radical, cationic and anionic initiators or polymerization catalysts. Such polymers may be prepared using bulk, solution or emulsion techniques. In any case, the polymer may be recovered as a solid such as a crumb, a powder, a pellet or the like. Polymers containing ethylenic unsaturation and polymers containing both aromatic and ethylenic unsaturation are available commercially from several suppliers.

Polymers of conjugated diolefins and copolymers of one or more conjugated diolefins and one or more alkenyl aromatic hydrocarbon monomers are frequently prepared in solution using anionic polymerization techniques. The present invention will, then, be described by reference to such polymers. It will, however, be appreciated that any polymer containing only the desired ethylenic unsaturation or both aromatic and ethylenic unsaturation could be processed in accordance with the method of this invention.

In general, when solution anionic techniques are used, conjugated diolefin polymers and copolymers of conjugated diolefins and alkenyl aromatic hydrocarbons are prepared by contacting the monomer or monomers to be polymerized simultaneously or sequentially with an organoalkali metal compound in a suitable solvent at a temperature within the range from about −150° C. to about 300° C., preferably at a temperature within the range from about 0° C. to about 100° C. Particularly effective anionic polymerization initiators are organolithium compounds having the general formula:

$$RLi_n$$

Wherein: R is an aliphatic, cycloaliphatic, aromatic or alkyl-substituted aromatic hydrocarbon radical having from 1 to about 20 carbon atoms and n is an integer of 1 to 4.

Conjugated diolefins which may be polymerized anionically include those conjugated diolefins containing from 4 to about 24 carbon atoms. The conjugated diolefins which may be used in the present invention are those which form a polymer wherein the double bond is positioned between a tertiary carbon atom and another carbon. Examples include isoprene (2-methyl-1,3-butadiene), 2-ethyl-1,3-butadiene, 2-propyl-1,3-butadiene, 2-butyl-1,3-butadiene, 2-pentyl-1,3-butadiene (2-amyl-1,3-butadiene), 2-hexyl-1,3-butadiene, 2-heptyl-1,3-butadiene, 2-octyl-1,3-butadiene, 2-nonyl-1,3-butadiene, 2-decyl-1,3-butadiene, 2-dodecyl-1,3-butadiene, 2-tetradecyl-1,3-butadiene, 2-hexadecyl-1,3-butadiene, 2-isoamyl-1,3-butadiene, 2-phenyl-1,3-butadiene, 2-methyl-1,3-pentadiene, 2-methyl-1,3-hexadiene, 2-methyl-1,3-heptadiene, 2-methyl-1,3-octadiene, 2-methyl-6-methylene-2,7-octadiene(myrcene), 2-methyl-1,3-nonyldiene, 2-methyl-1,3-decyldiene, and 2-methyl-1,3-dodecyldiene may be used, as well as the 2-ethyl, 2-propyl, 2-butyl, 2-pentyl, 2-hexyl, 2-heptyl, 2-octyl, 2-nonyl, 2-decyl, 2-dodecyl, 2-tetradecyl, 2-hexadecyl, 2-isoamyl and 2-phenyl versions of all of these dienes. Alkenyl aromatic hydrocarbons which may be copolymerized include vinyl aryl compounds such as styrene, various alkyl-substituted styrenes, alkoxy-substituted styrenes, vinyl naphthalene, alkyl-substituted vinyl naphthalenes and the like.

In general, any of the solvents known in the prior art to be useful in the preparation of such polymers may be used. Suitable solvents, then, include straight- and branched-chain hydrocarbons such as pentane, hexane, heptane, octane and the like, as well as alkyl-substituted derivatives thereof, cycloaliphatic hydrocarbons such as cyclopentane, cyclohexane, cycloheptane and the like, as well as alkyl-substituted derivatives thereof, aromatic and alkyl-substituted aromatic hydrocarbons such as benzene, naphthalene, toluene, xylene and the like, hydrogenated aromatic hydrocarbons such as tetralin, decalin and the like, halogenated hydrocarbons, particularly halogenated aromatic hydrocarbons, such as chlorobenzene, chlorotoluene and the like, linear and cyclic ethers such as methyl ether, methyl ethyl ether, tetrahydrofuran and the like and ketones such as methyl ketone (acetone), methyl ethyl ketone, ethyl ketone (3-pentanone) and the like.

Conjugated diolefin polymers and conjugated diolefin-alkenyl aromatic copolymers which may be crosslinked in the present invention include polyisoprene, natural rubber, styrene-isoprene copolymers, styrene-isoprene-styrene copolymers, polymyrcene, polymers of the monomers listed two paragraphs above, copolymers of those monomers and styrene or the other alkenyl aromatic hydrocarbons listed in the same paragraph and some of the unsaturated copolymers described in U.S. Pat. Nos. 3,135,716, 3,150,209, 3,496,154, 3,498,960, 4,145,298 and 4,238,202, the disclosures of which patents are herein incorporated by reference. Conjugated diolefin-alkenyl aromatic hydrocarbon copolymers which may be crosslinked in accordance with this invention also include block copolymers such as some of the unsaturated polymers described in U.S. Pat. Nos. 3,231,635, 3,265,765 and 3,322,856, the disclosures of which patents are also incorporated herein by reference. In general, linear and branched polymers which may be crosslinked in accordance with the present invention include those which may be represented by the general formula:

$$A_z-(B-A)_y-B_x$$

Wherein:
- A is a linear or branched polymeric block comprising predominantly monoalkenyl aromatic hydrocarbon monomer units;
- B is a linear or branched polymeric block containing predominantly conjugated diolefin monomer units which form a polymer block wherein the double bond is positioned between a tertiary carbon and another carbon;
- x and z are, independently, a number equal to 0 or 1;
- y is a whole number ranging from 0 to about 15, and the sum of $x+z+y \geq 2$.

Polymers which may be treated in accordance with this invention also include coupled and radial block copolymers such as some of the unsaturated described in U.S. Pat. Nos. 4,033,888, 4,077,893, 4,141,847, 4,391,949 and 4,444,953, the disclosure of which patents are also incorporated herein by reference. Coupled and radial block copolymer which may be treated in accordance with the present invention include those which may be represented by the general formula:

$$[B_x-(A-B)_y-A_z]_n-C-P_{n'}$$

Wherein:
- A, B, x, y and z are as previously defined and $x+y+z \geq 1$; n and n' are, independently, numbers from 1 to about 100 such that $n+n' \geq 3$;
- C is the core of the coupled or radial polymer formed with a polyfunctional coupling agent; and each P is the same or a different polymer block or polymer segment having the general formula:

$$B'_{x'}-(A'-B'')_{y'}-A''_{z'} \text{ or } B''_{x'}-(A'-B')_{y'}-A'_{z'}$$

Wherein:
- A" is a polymer block containing predominantly monoalkenyl aromatic hydrocarbon monomer units; B' is defined as B above;
- A'—B" is a polymer block containing monoalkenyl aromatic hydrocarbon monomer units (A') and conjugated diolefin monomer units (B"), the A'—B" monomer units may be random, tapered or block and when A'—B" is block, the A' block may be the same or different from A" and B" may be the same or different from B'; x' and z' are, independently, numbers equal to 0 to 1; and
- y' is a number from 0 to about 15, with the proviso that the sum of $x'+y'+z' \geq 1$.

The radial polymers may, then, be symmetric or asymmetric.

The crosslinking agents which are useful in the present invention are amino resins. Amino-type crosslinking resins have been commonly used to cure acrylic, polyester and epoxy resins containing functional groups such as hydroxyl, amide, mercaptan and carboxyl groups for many years in industrial coatings. It has unexpectedly been found that amino crosslinking resins are useful in curing unsaturated nonfunctionalized polymers as described above.

For the purposes of this invention, an amino resin is a resin made by reaction of a material bearing NH groups with a carbonyl compound and an alcohol. The NH bearing material is commonly urea, melamine, benzoguanamine, glycoluril, cyclic ureas, thioureas, guanidines, urethanes, cyanamides, etc. The most common carbonyl component is formaldehyde and other carbonyl compounds include higher aldehydes and ketones. The most commonly used alcohols are methanol, ethanol, and butanol. Other alcohols include propanol, hexanol, etc. American Cyanamid sells a variety of these amino resins, as do other manufactures. American Cyanamid's literature describes three classes or "types" of amino resins that they offer for sale.

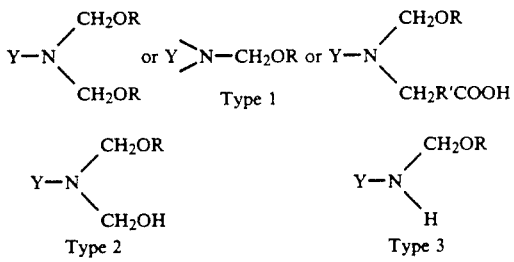

where Y is the material that bore the NH groups, the carbonyl source was formaldehyde and R is the alkyl group from the alcohol used for alkylation. Although this type of description depicts the amino resins as monomeric material of only one pure type, the commercial resins exist as mixtures of monomers, dimers, trimers, etc. and any given resin may have some character of the other types. Dimers, trimers, etc. also contain methylene or ether bridges. Generally, type 1 amino resins are preferred in the present invention.

For example, the following type 1 amino resins can be used to achieve the purpose of the present invention: CYMEL 303—hexamethyoxymethylmelamine resin where R is $CH_3$, CYMEL 1116—a melamine-formaldehyde resin where R is a mixture of $CH_3$ and $C_2H_5$, CYMEL 1156—a melamine-formaldehyde resin where R is $C_4H_9$, CYMEL 1123—benzoguanamine-formaldehyde resin where R is a mixture of $CH_3$ and $C_2H_5$, CYMEL 1170—a glycoluril-formaldehyde resin where R is $C_4H_9$, CYMEL 1171—a glycoluril-formaldehyde resin where R is a mixture of $CH_3$ and $C_2H_5$, CYMEL 1141—a carboxyl modified amino resin where R is a mixture of $CH_3$ and $i-C_4H_9$, BEETLE 80—a urea-formaldehyde resin where R is $C_4H_9$, BEETLE 65—a urea-formaldehyde resin where R is $CH_3$. All of these products are made by American Cyanamid Company and are described in its publication mentioned above along with other amino resins useful in the present invention.

One most preferred amino resin for use in the present invention is CYMEL 1170 glycoluril-formaldehyde resin where R is $C_4H_9$:

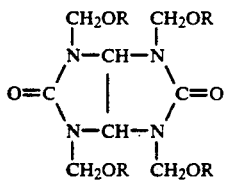

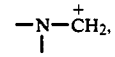

seeks electrons at the carbon-carbon double bonds on the polymer to effect crosslinking. Thus, the theoretical reaction mechanism is as follows using a 1,4-isoprene monomeric unit as an example:

Reaction A: Protonation of amino resin

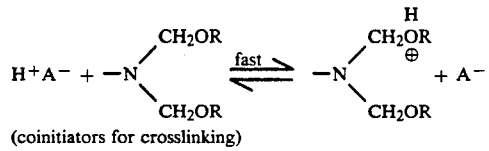

(coinitiators for crosslinking)

Reaction B: Dealkylation and generation resin fragment carbocation

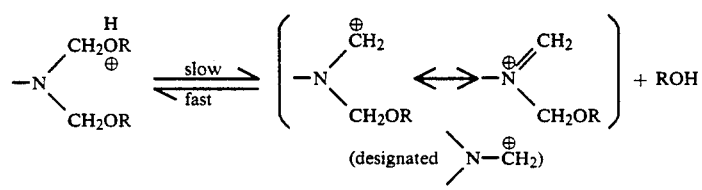

Reaction C: Primary crosslink reaction

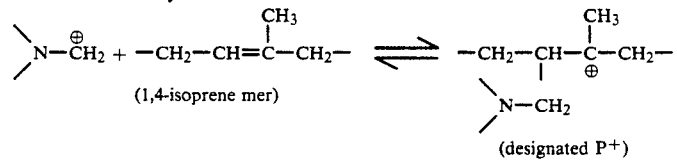

Reaction D: Chain transfer/termination of crosslinking

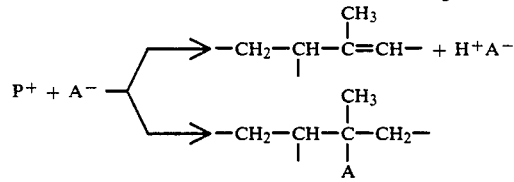

Another most preferred amino resin for use in the present invention is BEETLE® 80 urea-formaldehyde resin where R is $C_4H_9$ whose ideal monomeric structure is depicted:

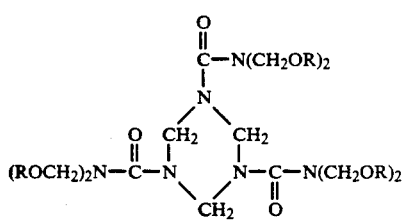

Since there are no functional groups, such as hydroxyl, amide, mercaptan or carboxyl groups, in the unsaturated polymers which are cured according the present invention, the conventional mechanism by which these amino resins cure functionalized polymers cannot be used to explain the reaction in the present system. A hypothesis which I put forth as a theory herein is that the carbonium ion, As will be seen by reviewing the examples below, the cure results with the amino resins of the present invention are reasonably consistent with the above reaction mechanism.

It has been determined that the amino resins will not cure all unfunctionalized unsaturated polymers or even all conjugated diene polymers. For instance, as shown in the examples, isoprene polymers can be crosslinked in this manner but butadiene polymers cannot be. I have found that these amino resins will only effectively crosslink polymers or polymer blocks wherein the double bond in the polymer or block is between a tertiary carbon atom and another carbon. It is theorized that this double bond is positioned such that when the amino resin reacts with a proton, $H^+$, and the polymer or block, a positive charge is created at the tertiary carbon atom. It is theorized that the amino resins will effectively crosslink in such a situation because a positive charge at a tertiary carbon atom is the most stable type of carbonium ion and because it is so stable, the crosslinking reaction is preferred and will proceed. If the positive charge is at a primary or secondary carbon atom, such as in butadiene, the charge is not sufficiently stable to allow the crosslinking reaction to proceed. As stated above, isoprene is the preferred conjugated diene monomer for use in the present invention because it is readily available and widely used in commercial polymers.

It is preferred that the amino resin be used in an amount ranging from about 0.5 to about 40% of the weight of the polymer if it is desired to effect a full cure. More preferably, the amount should be from about 1 to about 20% and most preferably between about 2 and about 10% because it is desirable to minimize appearance problems and major changes in the elasticity of the polymer.

A proton-donating acid catalyst is required to achieve the purposes of the present invention, i.e., crosslink the polymer using the amino resins described above. Generally, the temperature at which this is carried out ranges from about 200° F. to about 400° F. but lower temperatures may be used with longer curing times. It is preferred that the amount of the acid catalyst used range from about 0.1 to about 4% of the weight of the polymer to be certain there is sufficient acid but an excess can be undesirable. Most preferably, from about 0.5 to about 2% of the weight of the polymer is used. These ratios are sufficient if neat polymer is used. However, if the polymer is diluted, more acid will probably be necessary. The presence of a strong proton-donating acid is normally required to catalyze the crosslinking reaction of many amino resins which are useful in the present invention. However, some medium strength and even relatively weak acids may also be effective depending upon the amino resins used. Generally, the most active catalyst are those with the lowest pKa values. The following list of acid catalyst which may be used in the present invention is arranged according to increasing pKa value: mineral acids, Cycat® 4040 catalyst (p-toluene sulfonic acid), Cycat® 500 catalyst (dinonylnapthalene disulfonic acid), Cycat® 600 catalyst (dodecyl benzene sulfonic acid), oxalic acid, maleic acid, hexamic acid, phosphoric acid, Cycat® 296-9 catalyst (dimethyl acid pyrophosphate), phthalic acid and acrylic acid (copolymerized in polymer). Other acids which may be used are described in the aforementioned American Cyanamid Company publication. Also, 3M Brand Resin Catalyst FC-520 (diethylammonium salt of trifluoromethane sulfonic acid) may be used.

Blocking agents are commonly used to prevent premature catalyst activity. Amines such as triisopropanolamine and dimethylethanolamine work by buffering the effect of the acid and block it from catalyzing the reaction between the polymer and the amino resin. Other blocking agents include triethylamine, methyldiethanolamine, diethylethanolamine, triethanolamine, diisopropanolamine, morpholine and 2-amino-2-methyl-1-propanol, water, primary, secondary and tertiary alcohols, as well as others described in the aforementioned American Cyanamide Company publication.

In general, the method for carrying out the crosslinking of the block copolymers is as follows: Mix the block copolymer with other formulating ingredients and mix in the desired amino resin. The acid co-initiator is added shortly before application of the formulation to the substrate. The substrate with the formulation is heated by a suitable means to about 200° F.–400° F. to effect cure. To maintain a long package shelf life or a reasonable pot life in case of a hot melt formulation a suitable amine, alcohol or water is added to the formulation to block the acid and the curing reactions. Upon application of heat, the blocking agents are driven off and cure is effected.

The present invention has many advantages. One advantage is that it avoids the problem of radiation curing which primarily is the cost of the expensive equipment or formulation ingredients required for such crosslinking. This type of chemical crosslinking is a good crosslinking system for a solvent-borne polymer system since the polymer has to go into an oven to drive off the solvent, the cure or crosslinking can be achieved at the same time. The present invention could be used in combination with radiation curing wherein the polymer is partially cured with radiation curing and the curing is completed immediately or at a later time by use of the present invention. One of the most important advantages of the present invention is that it allows crosslinking of the polymer sometime after application of the formulation. For instance, all of the ingredients could be mixed in with the polymer and a slowly decomposing or evaporating blocking agent could be added. The acid catalyst would not catalyze the reaction until the blocking agent decomposes or evaporates. If the right combination of materials is chosen, the curing could take place over a period of many months. This could be of advantage for uses where it is desired that the curing take place after the service temperature has been reached so that all stresses have been relieved (i.e. automotive and electrical product adhesives).

The crosslinked materials of the present invention are useful in adhesives (including pressure sensitive adhesives, contact adhesives, laminating adhesives and assembly adhesives), sealants, coatings, films (such as those requiring heat and solvent resistance), etc. In adhesive applications, it may be necessary to add an adhesion promoting or tackifying resin that is compatible with the polymer. A common tackifying resin is a diene-olefin copolymer of piperylene and 2-methyl-2-butene having a softening point of about 95° C. This resin is available commercially under the tradename Wingtack 95 and is prepared by the cationic polymerization of 60% piperylene, 10% isoprene, 5% cyclopentadiene, 15% 2-methyl-2-butene and about 10% dimer, as taught in U.S. Pat. No. 3,577,398. Other tackifying resins of the same general type may be employed in which the resinous copolymer comprises 20–80 weight percent of piperylene and 80–20 weight percent of 2-methyl-2-butene. The resins normally have softening points (ring and ball) between about 80° C. and about 115° C.

Other adhesion promoting resins which are also useful in the compositions of this invention include hydrogenated rosins, esters of rosins, polyterpenes, terpenephenol resins and polymerized mixed olefins, lower softening point resins and liquid resins. An example of a liquid resin is Adtac LV from Hercules. To obtain good thermo-oxidative and color stability, it is preferred that the tackifying resin be a saturated resin, e.g., a hydrogenated dicyclopentadiene resin such as Escorez® 5000 series resin made by Exxon or a hydrogenated polystyrene or polyalphamethylstyrene resin such as Regalrez® resin made by Hercules. The amount of adhesion promoting resin employed varies from about 20 to about 400 parts by weight per hundred parts rubber (phr), preferably between about 70 to about 350 phr. The selection of the particular tackifying agent is, in large part, dependent upon the specific polymer employed in the respective adhesive composition.

The adhesive composition of the instant invention may contain plasticizers, such as rubber extending plasticizers, or compounding oils or organic or inorganic pigments and dyes. Rubber compounding oils are well-known in the art and include both high saturates content oils and high aromatic content oils. Preferred plasticizers are highly saturated oils, e.g. Tufflo ® 6056 oil made by Arco and process oils, e.g. Shellflex ® 371 oil. The amounts of rubber compounding oil employed in the invention composition can vary from 0 to about 100 phr, and preferably between about 0 to about 60 phr.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the adhesive composition.

Combinations of primary and secondary antioxidants are preferred. Such combinations include sterically hindered phenolics with phosphites or thioethers, such as hydroxyphenylpropionates with aryl phosphates or thioethers, or amino phenols with aryl phosphates. Specific examples of useful antioxidant combinations include 3-(3,5-di-t-butyl-4-hydroxyphenyl)propionate)methane (Irganox 1010 from Ciba-Geigy) with tris(nonylphenyl)phosphite (Polygard HR from Uniroyal), Irganox 1010 with bis(2,4-di-t-t-butyl)pentaerythritol disphosphite (Ultranox 626 from Borg-Warner), 4-((4,6-bis(octylthio)-s-triazin-2-yl)amino)-2,6-di-t-butylphenol (Irganox 565) with Polygard HR, and Irganox 565 with Ultranox 626.

Additional stabilizers known in the art may also be incorporated into the adhesive composition. These may be for protection during the life of the article against, for example, oxygen, ozone and ultraviolet radiation. However, these additional stabilizers should be compatible with the essential stabilizers mentioned hereinabove and their intended function as taught herein.

The adhesive compositions of the present invention are typically prepared by blending the components at an elevated temperature, preferably between about 130° C. and about 200° C., until a homogeneous blend is obtained, usually less than three (3) hours. Various methods of blending are known to the art and any method that produces a homogeneous blend is satisfactory. The resultant adhesives may then preferably be used in a wide variety of product assembly applications. Alternatively, the ingredients may be blended into a solvent.

The following examples are meant only to illustrate the present invention and not to limit it in any way.

EXAMPLE I

In this example and the following examples, three different block copolymers were used. Block copolymer A is a high molecular weight (1.2 million) isoprene-based S-I-S star polymer (KRATON ® D1320X) which is unsaturated. Block copolymer B is a very similar unsaturated star polymer. Block copolymer H is a linear S-B-S ahydrogenated polymer (KRATON ® G1652) of about 50,000 molecular weight containing about 40% 1,2-butadiene which has a tertiary carbon atom. The catalyst used in all cases was CYCAT ® 600 catalyst, a strong proton acid catalyst which is a 70% solution of dodecylbenzene sulfonic acid in isopropanol. Two different crosslinking agents were used, CYMEL ® 1170 glycoluril-formaldehyde resin and BEETLE ® 80 ureaformaldehyde resin. Both of the amino resins and the acid catalyst are made by American Cyanamid. In this example, 90 weight percent of the polymer, 9 weight percent of the aminoplast and 1 weight percent of the catalyst were blended in toluene solution at 20-30 weight percent solids.

All of the solutions were rolled overnight and then cast onto 25 micron Mylar to give about 75 microns of film when dry. The films were dried in a hood for two hours followed by four hours in a 40° C. vacuum oven. The films were covered with silicone release paper and stored overnight at 23° C. and 50% relative humidity before baking. The release paper was used to reduce potential degradative oxidation and dirt pick up in the oven. The films were mounted on aluminum panels during the baking. All of the films were cured in a fast recovery, electric, forced-draft air oven at the same time. The bake took place for 20 minutes at 177° C.

The degree of covalent cure obtained for each of the samples was measured by use of the standard polymer gel content test developed by me for radiation curing work and described in my article entitled "Experimental Thermoplastic Rubbers for Enhanced Radiation Crosslinking of Hot Melt PSA's", TAPPI 1985 *Hot Melt Symposium Proceedings*, June 1985, herein incorporated by reference. Since both the block copolymer and the crosslinking agent should become part of the network, the polymeric factor used in the polymer gel calculation was 0.99. For the neat polymer films, the factor was 1.00. Compatibility was judged by visual observation of the dry films before and after cure. A 0 to 10 rating scale was used where clear equals 10, hazy or slightly cloudy equals 8, cloudy equals 6, very cloudy equals 4 and very cloudy plus brown color equals 2. The results of the gel content and compatibility tests are shown in Tables 1 and 2 below.

TABLE 1

| | Gel Content, % | | |
|---|---|---|---|
| Polymer | Polymer Alone | CYMEL ® 1170 | BEETLE ® 80 |
| A | 2 | 98 | 96 |
| B | 1 | 94 | 57 |
| H | 1 | 1 | 1 |

TABLE 2

| | Compatibility | | | | | |
|---|---|---|---|---|---|---|
| | Polymer Alone | | CYMEL ® 1170 | | BEETLE ® 80 | |
| Polymer | Before Cure | After Cure | Before Cure | After Cure | Before Cure | After Cure |
| A | 10 | 10 | 8 | 8 | 6 | 6 |
| B | 10 | 8 | 8 | 2 | 10 | 10 |
| H | 10 | 10 | 6 | 6 | 6 | 8 |

Since the information available prior to this time about these crosslinking agents would lead one of ordinary skill in the art to believe that polymers without functional groups could not be crosslinked with these amino resins, it would be expected that no more than about 9% gel would be present in the crosslinked polymers upon baking—this due to self crosslinking of the 9% amino resin used. It can be seen that the crosslinking which actually occurred with polymers A and B was far in excess of what would have been predicted since the gel contents are far in excess of 9%. This shows that the hydrogenated butadiene polymer does not crosslink even though it has a tertiary carbon. There was no double bond and therefore no crosslinking. Most of the compatibility results are also good, showing that the curing has no effect on the visual compatibility of the polymers.

EXAMPLE II

The present experiments were carried out in accordance with the same procedure given for Example I with the exception that two different bake temperatures were utilized, two different levels of catalyst were utilized and two different antioxidants were added at two different levels. These experiments were carried out using block copolymer A, CYMEL ® 1170 resin, CYCAT ® 600 catalyst, Polygard ® HR antioxidant, made by Uniroyal, and Antioxidant 330 made by Ethyl Corporation.

The different formulations are shown in Table 3. The results are shown in Table 4.

TABLE 3

| Formulations | 4.1 | 4.2 | 4.3 | 4.4 | 4.5 | 4.6 | 4.7 | 4.8 |
|---|---|---|---|---|---|---|---|---|
| Polymer A | 90.9 | 90.0 | 90.0 | 89.1 | 90.0 | 89.1 | 89.1 | 88.2 |
| CYMEL 1170 | 9.1 | 9.0 | 9.0 | 8.9 | 9.0 | 8.9 | 8.9 | 8.8 |
| CYCAT 600 | 0 | 1.0 | 0 | 1.0 | 0 | 1.0 | 0 | 1.0 |
| Polygard HR | 0 | 0 | 1.0 | 1.0 | 0 | 0 | 1.0 | 1.0 |
| Antioxidant 330 | 0 | 0 | 0 | 0 | 1.0 | 1.0 | 1.0 | 1.0 |
| Total (grams) | 100.0 | 100.0 | 100.0 | 100.0 | 100.0 | 100.0 | 100.0 | 100.0 |
| Toluene (grams) | 150 | 150 | 150 | 150 | 150 | 150 | 150 | 150 |
| Bake Temperature (°C.) | 149 | 177 | 177 | 149 | 177 | 149 | 149 | 177 |

TABLE 4

| Formulations | 4.1 | 4.2 | 4.3 | 4.4 | 4.5 | 4.6 | 4.7 | 4.8 |
|---|---|---|---|---|---|---|---|---|
| % Gel | 1 | 99,97 | 0 | 88 | 0,0 | 100 | 1 | 93,96 |
| Compatibility Rating | | | | | | | | |
| Before Cure | 6 | 10,10 | 6 | 10 | 6,6 | 8 | 6 | 6,6 |
| After Cure | 6 | 10,10 | 6 | 10 | 6,6 | 8 | 6 | 6,6 |

The above results prove that the acid catalyst is absolutely necessary to achieve crosslinking since formulations 4.1, 4.3, 4.5 and 4.7, which did not contain acid catalysts, did not crosslink at all. The crosslinking of the other formulations was carried out quite well as evidenced by the percent gel and the compatibility ratings. This shows that the lower bake temperature and the presence of antioxidant has no detrimental effect on the crosslinking.

EXAMPLE III

All of the samples contained two antioxidants, Polygard ® HR and Irganox ® 1010 antioxidant made by Ciba-Geigy. The amount of the amino resin, the amount of the acid catalyst, the bake temperature and the bake time were varied.

In this example, the procedure of Example I was modified. The formulation ingredients, as shown in Table 5, except for the acid catalyst, were dissolved in the solvent and rolled overnight. A toluene solution of the acid catalyst was mixed in by hand about five minutes before the formulations were cast. The formulations were solvent cast onto Mylar sheets to provide about 3 mils of dry polymer film. The films were dried one hour in a hood but were not placed in a vacuum oven, covered or aged overnight at constant temperature and humidity for baking. The films were mounted on quarter inch thick Pyrex glass panels during the baking in an electric forced air oven with good recovery time. All of the 121° C. samples were cured at the same time and all of the 149° C. samples were cured at another time. The gel results obtained are given in Table 6.

TABLE 5

| Formulations | 5.1 | 5.2 | 5.3 | 5.4 | 5.5 | 5.6 | 5.7 | 5.8 |
|---|---|---|---|---|---|---|---|---|
| Polymer A | 94.5 | 89.5 | 94.0 | 89.1 | 94.5 | 89.5 | 94.0 | 89.1 |
| CYMEL 1170 | 4.0 | 9.0 | 4.0 | 8.9 | 4.0 | 9.0 | 4.0 | 8.9 |
| Irganox 1010 | 0.5 | 0.5 | 0.5 | 0.5 | 0.5 | 0.5 | 0.5 | 0.5 |
| Polygard HR | 0.5 | 0.5 | 0.5 | 0.5 | 0.5 | 0.5 | 0.5 | 0.5 |
| CYCAT 600 | 0.5 | 0.5 | 1.0 | 1.0 | 0.5 | 0.5 | 1.0 | 1.0 |
| Total (grams) | 100.0 | 100.0 | 100.0 | 100.0 | 100.0 | 100.0 | 100.0 | 100.0 |
| Toluene (grams) | 233.3 | 233.3 | 233.3 | 233.3 | 233.3 | 233.3 | 233.3 | 233.3 |
| Bake temperature (°C.) | 121 | 121 | 121 | 121 | 149 | 149 | 149 | 149 |
| Bake time (min.) | 10 | 20 | 20 | 10 | 20 | 10 | 10 | 20 |

TABLE 6

| Formulations | 5.1 | 5.2 | 5.3 | 5.4 | 5.5 | 5.6 | 5.7 | 5.8 |
|---|---|---|---|---|---|---|---|---|
| % Gel | 0 | 0 | 96 | 98 | 92 | 95 | 97 | 100 |

The results show that the amount of aminoplast and the bake time had no significant effect on the degree of covalent network formation (cross-linking) as measured by percent gel. Both the high levels and the low levels cured well. However, there was some effect of the catalyst level and the bake temperature. The combination of 0.5% acid catalyst and 121° C. bake did not produce curing. The reason for this is that the temperature was too low for the small amount of catalyst used.

EXAMPLE IV

Improved Laminating Adhesives

Formulations A, B and C (Table 7) were prepared by weighing all of the ingredients, except for the CYCAT 600 catalyst, into glass bottles and rolling the bottles for 24 hours to make a uniform solution. The CYCAT ® 600 catalyst was then added and mixed in for 2.5 minutes and then each solution was allowed to sit for 30 minutes before casting thin films. Films were applied to silicone release paper using a Bird applicator. The films were allowed to dry for about 24 hours in a hood. The dry film thickness was about 1.5 mils. Each film was covered with a sheet of 100% cotton paper and then the paper and adhesive were pulled off the silicone release paper. Each adhesive film was covered with a second sheet of cotton paper to produce a laminate having the adhesive film as the middle layer. Each sheet of laminate was cut in half. One half was cured for 10 minutes at 250° F. in a 12 ton Carver Press Model C using a one ton pressure and the other half was cured for 10 minutes at 300° F. using the same pressure. One inch diameter discs were cut from each of the laminates and were placed in 100 mls of toluene in 4 ounce bottles. The bottles containing the laminates were rolled at room temperature for 24 hours. Formulations A and B, which contained the isoprene based block polymer A and CYMEL ® 1170 resin, held the laminates together, while formulation C, which did not contain CYMEL ® 1170 resin, completely dissolved in the toluene and allowed the two layers of paper to completely separate from each other. See Table 8.

TABLE 7

| Ingredient | A | B | C |
| --- | --- | --- | --- |
| Block copolyer A | 42.7 | 90.0 | 47.2 |
| Wingtack ® 95[1] | 32.0 | 0.0 | 35.3 |
| Adtac ® B10[2] | 15.0 | 0.0 | 16.6 |
| BHT[3] | 0.43 | 0.46 | 0.47 |
| Polygard ® HR | 0.43 | 0.46 | 0.47 |
| CYMEL ® 1170 | 8.5 | 8.2 | 0.0 |
| Toluene | 233.3 | 233.3 | 233.3 |
| CYCAT ® 600* | 0.85 | 0.91 | 0.00 |

*Added as a 5% solution in toluene.
[1]Wingtack 95 is a high softening point tackifying resin.
[2]Adtac ® B10 is a low softening point tackifying resin.
[3]Butylated hydroxy toluene.

TABLE 8

Laminate Appearance After Toluene Soak

| Press Temperature | A | B | C |
| --- | --- | --- | --- |
| 250° F. | intact | intact | paper loose |
| 300° F. | intact | intact | paper loose |

EXAMPLE V

The process of the present invention was carried out with several different polymers according to the procedure set forth below and the crosslinked samples were evaluated for gel content. The formulations are set forth in Table 9 and the experimental results are set forth in Table 10. Block copolymer C is a radial butadiene S-B-S block copolymer (KRATON ® D1184) with a molecular weight of about 200,000 and was primarily comprised of 1,4-butadiene monomer units which have a double bond but no tertiary carbon. Block copolymer D resin is a linear isoprene S-I-S block copolymer (KRATON ® D1107) with a molecular weight of about 150,000. Block copolymer E is a partially hydrogenated butadiene-isoprene (S-B/I-S) block copolymer which contains about 6-7% unhydrogenated isoprene units and is primarily 1,4-isoprene with a molecular weight of 50,000. CYMEL ® 303 resin is a hexamethoxymethylmelamine resin.

TABLE 9

| Ingredients (%) | A | B | C | D | E | F | G |
| --- | --- | --- | --- | --- | --- | --- | --- |
| Block Copolymer A | 94 | 94 | 94 | — | — | — | 98 |
| Block Copolymer C | — | — | — | 94 | — | — | — |
| Block Copolymer D | — | — | — | — | 94 | — | — |
| Block Copolymer E | — | — | — | — | — | 94 | — |
| Cymel ® 1170 | 4 | — | — | 4 | 4 | 4 | — |
| Cymel ® 303 | — | 4 | — | — | — | — | — |
| Beetle ® 80 | — | — | 4 | — | — | — | — |
| Irganox ® 1010 | 0.50 | 0.50 | 0.50 | 0.50 | 0.50 | 0.50 | 0.50 |
| Polygard ® HR | 0.50 | 0.50 | 0.50 | 0.50 | 0.50 | 0.50 | 0.50 |
| Toluene | 300.00 | 300.00 | 300.00 | 300.00 | 233.30 | 300.00 | 300.00 |
| Cycat ® 600 | 1.00 | 1.00 | 1.00 | 1.00 | 1.00 | 1.00 | 1.00 |

Procedure

The test formulations were prepared by adding all the ingredients, except for the CYCAT ® 600 catalyst, to glass jars and rolling overnight to dissolve the mixtures. The catalyst was added as a 5% solution in toluene just before casting the test films. Specifically, the catalyst was hand mixed into the solution for 5 minutes and then the solution was allowed to set for about 10 minutes before application to 1 mil Mylar sheets. The films were placed in a hood for about 1 hour to partially dry before baking. Final baked film thickness of the polymeric films was about 75 microns. Bake conditions were 20 minutes at 149° C. using a forced-draft electric oven.

TABLE 10

Gel Contents on Heat Cured Kraton ® Rubber

| Formulation | Gel Content | Solution Fluidity 7 Days* | 108 Days |
| --- | --- | --- | --- |
| A | 100 | gel | gel |
| B | 0 | fluid | fluid |
| C | 98 | gel | gel |
| D | 2 | fluid | fluid |
| E | 85 | fluid | fluid |
| F | 0 | fluid | fluid |
| G | 27 | fluid | fluid** |

*Day after addition of the Cycat ® 600
**Turned dark brown color as did the Cycat ® 600 solution used.

The results show that the unsaturated isoprene polymer cured quite well with preferred amino resins, Cymel ® 1170 and Beetle ® 80 resins (A and C), but that the Cymel ® 303 resin was ineffective under these conditions (formulation B). Also, it is quite apparent that the linear unsaturated isoprene polymer D cured very well with the preferred amino resin, Cymel ® 1170 resin (formulation E). In contrast, the radial butadiene polymer with few tertiary carbons and no double bonds attached to tertiary carbons did not cure at all (formulation D) even with the preferred amino resins. The partially hydrogenated polymer (formulation F) did not cure at all because it contained only a small amount of unhydrogenated isoprene. Formulation G without amino resin cured ineffectively. Therefore, it is shown that the isoprene polymers cure very well while the hydrogenated polymers and the butadiene polymers do not cure at all. Those formulations that cured well also lacked long term room temperature package stability, since the solution formulation gelled each time. This indicates that the curing will occur at room temperature given enough time. This feature would make them useful in contact assembly adhesives.

EXAMPLE VI

In this example, the block copolymer A was crosslinked with a variety of amino resins and several different catalysts. In most cases, the catalyst was blocked with diisopropanolamine. From the results, it is apparent that this blocking agent had too high a boiling point, it was not driven off fast enough during the experiment because it effectively blocked the activity of the catalyst in most of these experiments. For completeness, the formulations are shown in Table 11 and the experimental results in Table 12. The procedure is set forth below.

TABLE 11

| Ingredients | H | I | J | K | L | M | N | O | P | Q | R | S | T | U | V | W | X |
|---|---|---|---|---|---|---|---|---|---|---|---|---|---|---|---|---|---|
| Block Copolymer A | 94 | 94 | 94 | 94 | 94 | 94 | 94 | 94 | 94 | 94 | 94 | 94 | 94 | 94 | 94 | 94 | 94 |
| Cymel ® 1170 | 4 | 4 | | | | | | | | | | | | | | | |
| Cymel ® 303 | | | 4 | | | | | | | | | | | | | | |
| Cymel ® 327 | | | | 4 | 4 | | | | | | | | | | | | |
| Cymel ® 370 | | | | | | 4 | 4 | | | | | | | | | | |
| Cymel ® 1116 | | | | | | | | 4 | | | | | | | | | |
| Cymel ® 1123 | | | | | | | | | 4 | | | | | | | | |
| Cymel ® 1125 | | | | | | | | | | 4 | | | | | | | |
| Cymel ® 1141 | | | | | | | | | | | 4 | | | | | | |
| Cymel ® 1156 | | | | | | | | | | | | 4 | | | | | |
| Cymel ® 1158 | | | | | | | | | | | | | 4 | 4 | | | |
| Cymel ® 1171 | | | | | | | | | | | | | | | 4 | | |
| Beetle ® 80 | | | | | | | | | | | | | | | | 4 | |
| Beetle ® 65 | | | | | | | | | | | | | | | | | 4 |
| Irganox ® 1010 | .5 | .5 | .5 | .5 | .5 | .5 | .5 | .5 | .5 | .5 | .5 | .5 | .5 | .5 | .5 | .5 | .5 |
| Polygard ® HR | .5 | .5 | .5 | .5 | .5 | .5 | .5 | .5 | .5 | .5 | .5 | .5 | .5 | .5 | .5 | .5 | .5 |
| Toluene | 300 | 300 | 300 | 300 | 300 | 300 | 300 | 300 | 300 | 300 | 300 | 300 | 300 | 300 | 300 | 300 | 300 |
| 5% Cycat ® 600 | 1.0 | | | | | | | | | | | | | | | | |
| 5% Cycat ® 600 (Blocked) | | 1.0 | 1.0 | | 1.0 | | 1.0 | 1.0 | 1.0 | 1.0 | 1.0 | 1.0 | | 1.0 | 1.0 | 1.0 | 1.0 |
| 5% Cycat ® 269-9 | | | | 1.0 | | 1.0 | | | | | | | 1.0 | | | | |

Procedure

The sample preparation, coating and curing were done in the same manner as in the Example V. The diisopropanolamine was added to the 5% solution of the CYCAT ® 600 in toluene. A 1:1 stochiometric ratio was used. Baking conditions remained 20 minutes at 149° C.

TABLE 12

Gel Contents of Heat Cured KRATON ® Rubber

| Formulation | Gel Content |
|---|---|
| H | 98 |
| I | 1 |
| J | 1 |
| K | 2 |
| L | 0 |
| M | 1 |
| N | 1 |
| O | 3 |
| P | 56 |
| Q | 12 |
| R | 8 |
| S | 65 |
| T | 1 |
| U | 1 |
| V | 2 |
| W | 83 |
| X | 2 |

The addition of the blocking agent had the expected effect on the solution formulations. All of the solutions remained fluid when stored at 25° C. for 99 days. Sample H which was not blocked does show very good results in terms of gel content. Samples I, J, L, N, O, Q, R, U, V and X all used blocked catalyst and the results are very poor. Samples P and S show partial gelling which may be due to partial elimination of the blocking agent. Sample W used a blocking agent and the results were reasonably good indicating that in this case, most of the blocking agents had been drive off prior to reaction with the amino resin. Formulations K, M and T utilized the relatively weak catalyst Cycat ® 269-9 resin. It is thought that the lack of success may partially be due to the use of this relatively weak catalyst. However, there are situations in which relatively weak catalyst might be very useful in the performance of the present invention (for example, see Example IX below).

EXAMPLE VII

In this series of experiments, several different polymers were tested with several different amino resins. The catalyst was not blocked in any of these tests. The formulations are shown in Table 13 and the experimental results are shown in Table 14. All preparation, coating and baking conditions were the same as in Example V. Bake temperature remained at 20 minutes at 149° C.

TABLE 13

| Ingredients | AA | BB | C | DD | EE | FF | GG | HH | II | JJ | KK | LL | MM | NN |
|---|---|---|---|---|---|---|---|---|---|---|---|---|---|---|
| Block Copolymer A | 94 | 94 | 94 | 94 | 94 | 94 | 94 | 94 | 94 | 94 | | | | |
| Block Copolymer C | | | | | | | | | | | 94 | 94 | | |
| Block Copolymer D | | | | | | | | | | | | | 94 | 94 |
| Cymel ® 1156 | 4 | | | | | | | | | | | | | |
| Cymel ® 1116 | | 4 | | | | | | | | | | | | |
| Cymel ® 1158 | | | 4 | | | | | | | | | | | |
| Cymel ® 1170 | | | | 4 | | | | | | | | | | |
| Cymel ® 1171 | | | | | 4 | | | | | | | | | |
| Cymel ® 1123 | | | | | | 4 | | | | | | | | |
| Cymel ® 1125 | | | | | | | 4 | | | | | | | |
| Cymel ® 1141 | | | | | | | | 4 | | | | | | |
| Beetle ® 80 | | | | | | | | | 4 | | 4 | | 4 | |
| Beetle ® 65 | | | | | | | | | | 4 | | 4 | | 4 |
| Irganox ® 1010 | .5 | .5 | .5 | .5 | .5 | .5 | .5 | .5 | .5 | .5 | .5 | .5 | .5 | .5 |
| Polygard ® HR | .5 | .5 | .5 | .5 | .5 | .5 | .5 | .5 | .5 | .5 | .5 | .5 | .5 | .5 |
| Toluene | 300 | 300 | 300 | 300 | 300 | 300 | 300 | 300 | 300 | 300 | 300 | 300 | 300 | 300 |

TABLE 13-continued

| Ingredients | FORMULATIONS: % (25% solids) | | | | | | | | | | | | | |
|---|---|---|---|---|---|---|---|---|---|---|---|---|---|---|
| | AA | BB | C | DD | EE | FF | GG | HH | II | JJ | KK | LL | MM | NN |
| Cycat ® 600 | 1.0 | 1.0 | 1.0 | 1.0 | 1.0 | 1.0 | 1.0 | 1.0 | 1.0 | 1.0 | 1.0 | 1.0 | 1.0 | 1.0 |

TABLE 14

Gel Contents of Heat Cured KRATON ® Rubber

| Formulation | Gel Content | Solution Fluidity | | Film Appearance |
|---|---|---|---|---|
| | | 3 Days* | 87 Days* | |
| AA | 100 | fluid | fluid | 2 |
| BB | 100 | fluid | fluid | 2 |
| CC | 46 | fluid | fluid | 2 |
| DD | 100 | gel | gel | 9 |
| EE | 100 | gel | gel | 6 |
| FF | 100 | fluid | fluid | 2 |
| GG | 99 | fluid | fluid | 2 |
| HH | 86 | fluid | fluid | 2 |
| II | 100 | gel | gel | 9 |
| JJ | 99 | rubbery | gel | 6 |
| KK | 0 | fluid | fluid | 1 |
| LL | 1 | fluid | fluid | 1 |
| MM | 70 | fluid | gel | 9 |
| NN | 56 | fluid | fluid | 9 |

*Days after addition of CYCAT ® 600.

Again, it is shown that the butadiene polymer (formulations KK and LL) is not crosslinked when treated according to the present invention. In addition, it can be seen that most of the amino resins used worked well with the isoprene star polymer and that the linear isoprene polymer was crosslinked reasonably well.

EXAMPLE XIII

Example XIII was designed to provide information on the effectiveness of using an alcohol as the blocking agent and the ability of a weak acid to function as the co-initiator.

The specific polymer/amino resin formulations shown in Table 15 were prepared and tested. The sample preparation, coating and curing were done in the same manner as in Example V. The Test results are given in Table 16.

TABLE 15

| Formulations | A | B | C | D |
|---|---|---|---|---|
| Polymer A | 94.0 | 94.0 | 94.0 | 94.0 |
| CYMEL 1170 | 4.00 | 4.00 | 4.00 | 4.00 |
| Irganox 1010 | 0.50 | 0.50 | 0.50 | 0.50 |
| Polygard HR | 0.50 | 0.50 | 0.50 | 0.50 |
| n-Butanol | — | 75 | — | — |
| Toluene | 300 | 225 | 300 | 300 |
| CYCAT 600 | 1.00 | 1.00 | — | — |
| CYCAT 296-9 | — | — | 1.00 | 2.00 |

TABLE 16

| Formulations | A | B | C | D |
|---|---|---|---|---|
| % Gel Content | 100 | 100 | 1 | 87 |
| Film* Appearance, rating | 8 | 7 | 4 | 4 |
| Solution Fluidity | | | | |
| 7 days** | gel | fluid | fluid | fluid |
| 60 days | gel | fluid | fluid | fluid |

*After baking.
**After acid addition.

The addition of the butanol to the solvent system (Formulation B) prevented the gellation in the package without interfering with the cure. The weak acid CYCAT ® 296-9 was able to co-initiate the cure reactions when used at the 2% level (Formulation D) but not at the 1% level of addition (Formulation C). However, the cure was not as good as that normally obtained by using the CYCAT ® 600.

EXAMPLE IX

SIS based hot melt pressure sensitive adhesives (PSA's) must often be kept in open stirred tanks at customer facilities for periods as long as 24 or 48 hours at 177° C. This causes the viscosity to decrease substantially due to chain scission of the SIS polymer. It would be very desirable if these viscosity changes did not occur. If a competing chain building or crosslinking reaction could be made to occur at about the same rate as the chain scission reaction over a reasonable range of temperature and time conditions, at least the viscosity would appear not to change significantly. The present experiment was done to determine whether small amounts of the amino resins have potential in this regard.

The PSA formulations given in Table 17 were prepared in a sigma blade mixer, oven aged at 177° C. for 24 hours and tested for viscosity. A number of the samples were completely replicated. Polygard ® antioxidant instead of Polygard HR ® antioxidant was deliberately used. It was hoped that the Polygard ® antioxidant, a phosphite, would generate phosphoric acid during oven aging and catalyze the crosslinking resins as needed. For oven aging, part (100 grams) of the freshly prepared hot melt was poured into a 200 ml tall form glass beaker, covered with aluminum foil, and placed in an electric forced draft air oven. Hot melt viscosity measurements at 177° C. were made on a Brookfield Thermocel Viscometer using a No. 29 spindle at low rpm.

TABLE 17

| Formulations for Improved SIS PSA Hot Melt Stability | | | | | |
|---|---|---|---|---|---|
| Formulations | 8.1 | 8.2 | 8.3 | 8.4 | 8.5 |
| F/G* | 24.9 | 24.6 | 24.6 | 24.6 | 24.6 |
| Polygard ® | 0.25 | 0.25 | 0.25 | 0.25 | 0.25 |
| Ionol ® | 0.25 | 0.25 | 0.25 | 0.25 | 0.25 |
| Escorez ® 5300 resin | 59.7 | 59.1 | 59.1 | 59.1 | 59.1 |
| Tufflo ® 6056 oil | 14.9 | 14.8 | 14.8 | 14.8 | 14.8 |
| Cymel ® 303 | 0 | 1.5 | 0 | 0 | 0 |
| Cymel ® 1156 | 0 | 0 | 1.5 | 0 | 0 |
| Cymel ® 1170 | 0 | 0 | 0 | 1.5 | 0 |
| Beetle ® 80 | 0 | 0 | 0 | 0 | 1.5 |
| TOTAL | 100.0 | 100.0 | 100.0 | 100.0 | 100.0 |

The ingredients are listed in their order of addition to the sigma blade mixer. The amino resin was premixed into the oil. The total mixing time of each formulation was 35 minutes, with the amino resin/oil blend added about 30 minutes into the mix.
*65/35 blend of KRATON ® D1111 block copolymer F and KRATON ® D1117 block copolymer G.

TABLE 18

| Melt Viscosity Results | | | | |
|---|---|---|---|---|
| Formulation | Crosslinking resin | Initial (cp) | Melt Viscosity 177 deg. C. Aged** (cp) | Retention (%) |
| 8.1 | none | 3550 | 1810 | 51 |
| 8.1 | none | 4340 | 1990 | 46 |
| 8.2 | Cymel ® 303 | 4440 | gel | infinite |
| 8.2 | Cymel ® 303 | 4050 | 6040 | 149 |
| 8.3 | Cymel ® 1156 | gel | gel | infinite |

TABLE 18-continued

Melt Viscosity Results

| Formulation | Crosslinking resin | Initial (cp) | Melt Viscosity 177 deg. C. Aged** (cp) | Retention (%) |
|---|---|---|---|---|
| 8.4 | Cymel ® 1170 | 4270 | 1980 | 46 |
| 8.4 | Cymel ® 1170 | 3990 | 3710 | 93 |
| 8.5 | Beetle ® 80 | 2780 | 1800 | 65 |

*Many of the formulations were duplicated. This involved completely remaking them on the sigma blade mixer and testing on different days.
**Aged for 24 hours at 177° C.
The sample began crosslinking in the viscometer.

The viscosity results are given in Table 18. The Cymel ® 303 and Cymel ® 1156 resins were surprisingly active and gelled the adhesives. Thus it can be seen that Cymel ® 303 which did not work well in the earlier short term tests does work to crosslink (form a gel) in an aging test at higher temperature. Additionally, this experiment utilized the relatively weak acid, phosphoric acid, so it can be seen that there are applications where weak acids can be used in the present invention.

EXAMPLE X

Use of Triflic Acid Salt

The purpose of this experiment was to determine the effectiveness of FC-520 as a co-initiator for the amino resin/polymer cure reactions. FC-520 is a 60% solution of the diethylammonium salt of trifluoromethanesulfonic (triflic) acid in water and diethylene glycol monoethyl ether and is supplied by the 3M Company. FC-520 is recommended for use in coating formulations that contain both epoxy resins and conventional functionalized polymers that undergo condensation cure with amino resins. The FC-520 is reported to be able to activate the required dual cure. It initiates the cationic chain reaction through the epoxy groups and also catalyzes the reaction between the amino resin and hydroxyl bearing polymer.

The formulations tested are shown in Table 19. The FC-520 was used without an amino resin present in Formulation 9B to test for the ability of the FC-520 to promote cure. In Formulation 9C, it was tested as a co-initiator with CYMEL ® 1170. FC-520 is more polar and much more expensive than CYCAT ® 600. Consequently, the solvent system used was the 25/75 n-butanol/toluene solvent system and the level of the FC-520 was restricted to only 0.5% of the solids. Table 20 shows the results.

TABLE 19

Use of Triflic Acid Salt

| Formulation ID | 9A | 9B | 9C |
|---|---|---|---|
| Polymer A | 99.0 | 98.5 | 94.5 |
| CYMEL ® 1170 | — | — | 4.00 |
| Irganox ® 1010 | 0.50 | 0.50 | 0.50 |
| Polygard ® HR | 0.50 | 0.50 | 0.50 |
| n-Butanol | 75 | 75 | 75 |
| Toluene | 225 | 225 | 225 |
| FC 520 | — | 0.50 | 0.50 |

TABLE 20

| Formulation ID | 9A | 9B | 9C |
|---|---|---|---|
| FC 520 | 0 | .5% | .5% |
| CYMEL ® 1170 | 0 | 0 | 4 |
| % Gel Content | 0 | 1 | 61 |
| Film* Appearance, rating | 7.5 | 5.5 | 6.5 |
| Solution Fluidity | | | |

TABLE 20-continued

| Formulation ID | 9A | 9B | 9C |
|---|---|---|---|
| 7 days** | fluid | fluid | fluid |
| 60 days | fluid | fluid | fluid |

*After baking.
**After acid addition.

Thus, the combination of the weak catalyst (FC-520) and the amino resin is shown to have the ability to reasonably effectively crosslink the polymer.

I claim:

1. A chemically crosslinked polymer containing a tertiary carbon atom wherein an amino resin is attached to a carbon atom adjacent to the tertiary carbon atom, wherein prior to crosslinking said polymer had less than 10 Meg/100 grams of polymer of functional groups which undergo a crosslinking reaction with amino resins.

2. A chemically crosslinked block copolymer which comprises at least one block A, said block A comprising predominantly monoalkenyl aromatic hydrocarbon units, and at least one block B, said block B comprising predominantly conjugated diolefin monomer units which have an amino resin attached to a carbon atom adjacent to a tertiary carbon atom, wherein prior to crosslinking said copolymer had less than 10 Meg/100 grams of copolymer of functional groups which undergo a crosslinking reaction with amino resins.

3. The copolymer of claim 2 wherein the conjugated diolefin is isoprene.

4. A chemically crosslinked polymer comprising conjugated diolefin monomer units wherein a diolefin has an amino resin attached to a carbon atom adjacent to a tertiary carbon atom, wherein prior to crosslinking said polymer had less than 10 Meq/100 grams of polymer of functional groups which undergo crosslinking reaction with amino resins.

5. The polymer of claim 4 wherein at least one conjugated diolefin is isoprene.

6. The polymer of claim 1 wherein the polymer contains isoprene.

7. An adhesive made with the chemically crosslinked polymer of claim 1.

8. An adhesive made with the chemically crosslinked copolymer of claim 2.

9. An adhesive made with the chemically crosslinked polymer of claim 4.

10. A sealant made with the chemically crosslinked polymer of claim 1.

11. A sealant made with the chemically crosslinked copolymer of claim 2.

12. A sealant made with the chemically crosslinked polymer of claim 4.

13. A coating made with the chemically crosslinked polymer of claim 1.

14. A coating made with the chemically crosslinked copolymer of claim 2.

15. A coating made with the chemically crosslinked polymer of claim 4.

16. A film made with the chemically crosslinked polymer of claim 1.

17. A film made with the chemically crosslinked copolymer of claim 2.

18. A film made with the chemically crosslinked polymer of claim 4.

19. The polymer of claim 1 wherein the amino resin is selected from the group consisting of glycoluril-formaldehyde resin and urea-formaldehyde resin.

20. The copolymer of claim 2 wherein the amino resin is selected from the group consisting of glycoluril-formaldehyde resin and urea-formaldehyde resin.

* * * * *